(12) United States Patent
Brotz

(10) Patent No.: US 7,605,189 B1
(45) Date of Patent: Oct. 20, 2009

(54) PROCESS FOR PRODUCING A PHENOLIC FOAM

(76) Inventor: Gregory R. Brotz, P.O. Box 1322, Sheboygan, WI (US) 53081

( * ) Notice: Subject to any disclaimer, the term of this patent is extended or adjusted under 35 U.S.C. 154(b) by 697 days.

(21) Appl. No.: 11/438,105

(22) Filed: May 22, 2006

(51) Int. Cl.
*C08L 61/10* (2006.01)
*C08J 9/00* (2006.01)

(52) U.S. Cl. ........................................ 521/136; 521/50
(58) Field of Classification Search .................... 521/50
See application file for complete search history.

(56) References Cited

U.S. PATENT DOCUMENTS 3,207,652 A * 9/1965 Shannon ..................... 521/181
3,792,141 A * 2/1974 Offutt ......................... 264/46.3
3,814,778 A * 6/1974 Hosoda et al. ............. 264/45.4
2002/0198268 A1* 12/2002 Harris et al. .................. 521/50

FOREIGN PATENT DOCUMENTS

GB      1098029     *  9/1965
NL      6502004     *  2/1965

* cited by examiner

*Primary Examiner*—Randy Gulakowski
*Assistant Examiner*—Kara Negrelli
(74) *Attorney, Agent, or Firm*—William Nitkin

(57) ABSTRACT

A process for producing a strong, lightweight, pH-neutral phenolic foam by providing a novelac resin and a resole resin with a solid-state blowing agent activated at a specific time in a melt for the formation of a foam.

13 Claims, 1 Drawing Sheet

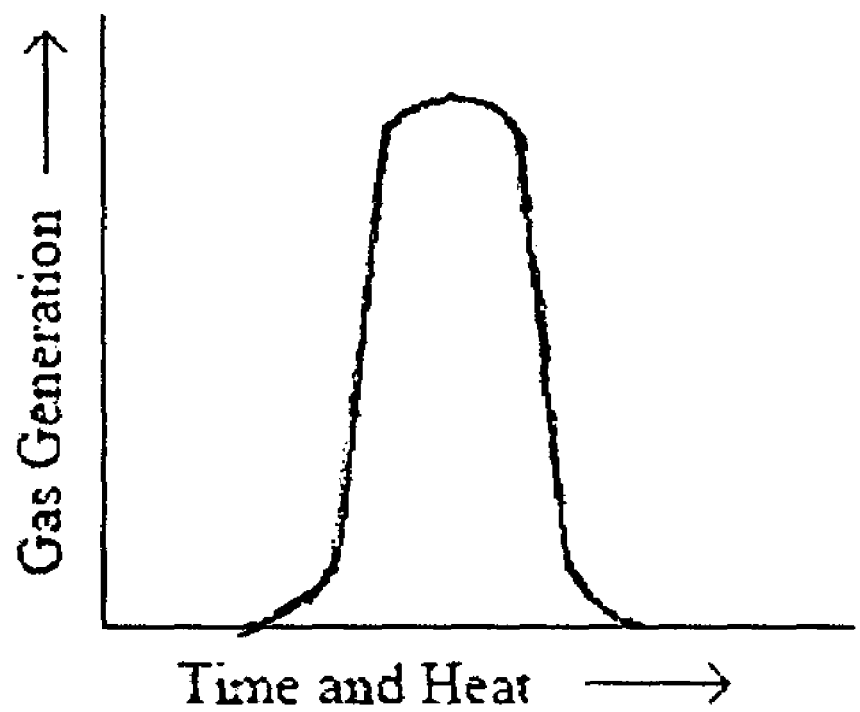

PROCESS FOR PRODUCING A PHENOLIC FOAM

BACKGROUND OF THE INVENTION

1. Field of the Invention

This invention resides in the field of phenolic plastics and more particularly relates to a process for producing a strong, lightweight phenolic foam.

2. History of the Prior Art

Phenolic foams are usually made by catalyzing a liquid phenolic (resole-type) resin which is mixed with blowing agents, such as pentane, and surfactants along with an acid, usually sulfonic. These foams have several problems, including that the remaining acid corrodes objects with which it comes in contact and these foams can spontaneously ignite when their temperatures are elevated to as low as 350 degrees F. Both resole and novolac resins are produced by a polycondensation reaction between phenol and formaldehyde. If the resole resin in its pure form is heated by itself on a platform, it will melt and, over time, cure to a strong, hard sheet. A novolac resin, being made by a formaldehyde-starved reaction, will melt but will remain as a liquid. Phenolic foams are very versatile and have many uses, such as for thermal insulation, fresh flower supports, mine/tunnel uses and for use in making orthopedic foot impressions. These applications are dependent upon the cellular structure of the foam where, for example, a closed cell foam is utilized for thermal insulation while an open-cell foam is used for floral applications. While many phenolic foams are made primarily from liquid resole resins, it is also well known to use novolac resins with chemical blowing agents.

A phenolic foam can also be made by foaming novolac resins using hexamethylenetetramine as a curing and blowing agent. These foams again have serious drawbacks. The decomposition of hexamethylenetetramine during heat cure into formaldehyde and ammonia leaves residual ammonia behind in the foam, making it basic in pH and odorous. Post backing can drive out the residual ammonia but if a closed cell structure is wanted, the outgassing process along with the added temperature hysteresis can be detrimental to the final foam product as well as increasing its production cost.

SUMMARY OF THE INVENTION

It is an object of this invention to produce a strong, lightweight phenolic foam by a new process which in one embodiment includes the steps of mixing 70% novolac resin, 30% resole resin by weight with a solid state blowing agent of about 1% of weight which are then roll-milled together on a heated roll mill until the two resins are slightly reacted with a very loose cross linking, forming a sheet of gel-like material on the roll. The gel sheet is cut off the roll and allowed to cool and is then ground into a fine powder. The powder is placed in a 350 degree F. oven and softens; and as gas is liberated by the heat-activated blowing agent, which can be Cylacell brand blowing agent being a mixture of sodium and magnesium silicates and borates, the melt begins to expand the softened resin into a foam. The foam can be left in the oven until the resin has cured after its expansion has stopped. In a preferred embodiment the lightweight phenolic foam is produced by a process having two rollings wherein a mixture of resole and novolac resins in a ratio between 20:80 and 80:20 is roll-milled under a shear force at a temperature above the resins' melting points, causing the two resins to react to produce a partial cross-linking to form a gel state. The gel is then cooled, hardened and ground into a fine powder. A solid state heat-activatable blowing agent in the range of 0.5% to 3% by weight based on the gel powder weight is dry mixed with the powdered phenolic pre-rolled resin gel. This second premix is then processed by a second shear force roll milling. The resulting mixture can be cooled and ground into a powder for later heating to form a foam, whether it be in a conveyor oven or in heated molds.

BRIEF DESCRIPTION OF THE DRAWINGS

The FIGURE illustrates a graph showing the time/temperature/outgassing relationship of the process of this invention.

DESCRIPTION OF THE PREFERRED EMBODIMENT(S)

In its basic form the first embodiment of this invention has the following steps:
1. Blending a novolac, a resole and a heat-activated blowing agent together to form a mixture;
2. Heating the mixture;
3. Expanding the mixture to form a foam; and
4. Heat-curing the resulting foam.

While this process does work to produce a foam, it is not the best foam.

A second embodiment of this invention has the following steps:
1. Blending a novolac, a resole and a heat-activated blowing agent together to form a mixture;
2. Roll milling the mixture to form a gel;
3. Heating the gel;
4. Expanding the gel to form a foam; and
5. Heat-curing the resulting foam.

In this process one could just leave the rolled material on the rolls, stop the rotation of the rolls and allow the material to foam and cure. The finish on the rolls must be such that the cured foam will release from the roll surface, yielding a useful foam in a curved shape.

A third embodiment of this invention includes the steps of:
1. Blending a novolac and a resole together to form a mixture;
2. Roll milling the mixture to form a gel;
3. Adding a heat-activated blowing agent directly onto the roll mixture;
4. Heating the mixture;
5. Expanding the mixture to form a foam; and
6. Heat-curing the resulting foam.

One can sprinkle the blowing agent powder onto the mixture as it is just rolled into a gel state, being still on the rolls, and using a roll knife to cut the blowing agent in to mix it in quickly, one can then stop the rolls and allow the foam to expand and cure.

A fourth embodiment of this invention includes the steps of:
1. Blending a novolac and a resole together to form a mixture and roll milling this mixture to form a gelled material;
2. Cutting the gelled material off the rolls;
3. Cooling this material;
4. Grinding this material;
5. Adding a heat-activated blowing agent to the ground material;
6. Re-rolling the new mixture to form an intimate blend;
7. Heating the mixture;
8. Expanding the mixture to form a foam; and
9. Heat-curing the resulting foam.

A fifth embodiment of this invention includes the steps of:
1. Blending a novolac and a resole powder together in a ratio to form a mixture;
2. Roll milling this mixture to form a gelled material;
3. Cutting the gelled material off the rolls;
4. Cooling this material;
5. Grinding this material;
6. Adding a heat-activated blowing agent to the ground material;
7. Re-rolling the new mixture to form an intimate blend;
8. Cutting the material off the rolls;
9. Cooling this material;
10. Grinding this material;
11. Heating the re-rolled ground material to a cure temperature that is also above the activation temperature of the blowing agent;
12. Expanding the mixture to form a foam; and
13. Heat-curing the resulting foam.

In the second embodiment a strong, lightweight phenolic foam can be produced by the following steps. First a 70% novolac resin is mixed with a 30% resole resin by weight along with a solid state blowing agent having a weight of about 1% of the weight of the above resin mixture. This mixture is roll-milled together with the rollers being heated to a temperature less than 250 degrees F. The capture and entrainment of evolved gas in a thermoset compound usually occurs within a specific time and temperature "cure window," which can be described as the period between the beginning of viscosity buildup at the onset of cure and the final set at completion of cure. As can be seen in the FIGURE, Cylacell brand blowing agent has a narrow bell curve as the activation temperature is around 250 degrees F. However, because the Cylacell brand blowing agent will generate gas below the idealized stated activation temperature at a reduced rate and because the rolling time to produce the resole/nonolac gel is very long at low roll temperatures, much of the latent gas which is produced by the Cylacell brand blowing agent becomes lost. But, at high rolling temperatures, for example at 350 degrees F. and above, all the latent gas is generated quickly and is lost again before rolling is complete.

In the third embodiment the blowing agent is added to the mixture being processed on the rolls after a gel state has been formed by simply distributing the proper weight of the blowing agent across the rolls and cutting it in with a knife to facilitate a fast addition and a well blended mixture. A roll knife, usually one per roll, is a pneumatically powered, pivoting blade that runs the length of the roll. When actuated, it cuts into the material on the roll down to the roll surface, cutting the material being processed off the roll as the roll rotates under or past the knife. If the blade is kept actuated for a complete rotation of the roll, all the material will be removed from the roll. However, if the knife is retracted, for example at 180 degrees of rotation, a flap of material will form and will still be attached to the material adhered to the roll surface. This attachment will pull the flap material back into the nip where the intense mixing will continue. This repeated "cutting" action is good for quickly mixing in additives to material being processed on mill rolls. In this third embodiment rolling the two resins can be slightly reacted with a very loose cross linking to form a gel. The blowing agent can be temperature-activated but would be fully preserved in an inactive state by the lack of temperature hysteresis.

In some embodiments the ratio of resole resin-to-novolac resin can be kept within the 20:80 to 80:20 ratio mixtures. It has been found that within these ratios of resole resin to novolac resin there can exist many different ways to mix or solubilize the mixture to bring the short phenolic oligomers of the resole resin close to the oligomers of the novolac resin.

In the fourth and fifth embodiments the gel sheet formed by the above-described process is cut off the roll, allowed to cool and then ground into a fine powder. When desired, the powder with the added blowing agent is then heated above 250 degrees F. to activate the blowing agent, melt the resins and expand to form a foam which is heat-cured and then cooled to form a foam solid.

In yet another embodiment of this invention the powdered mixture of novolac resin, resole resin and blowing agent, before it is formed into a gel, can be spread on a heat-resistant, nonstick belt and passed through a conveyor oven or heat tunnel having different temperature zones. The first temperature zone would be well below the activation temperature of the blowing agent. The zone temperature sequence would be the first zone set at a temperature of about 175 degrees F. and a residence time of about 10 minutes. This process is particularly useful when the resin needs to be further advanced before activation of the blowing agent, and the residence time of the resin in the low temperature zone can be as long as 15 minutes at a temperature of 150 degrees F. to 220 degrees F. In order to avoid the formation of micro globules of cured resole resin forming within a nonolac matrix, mixing is desirable. A set of stationary paddles covered with Teflon brand nonstick material can be provided which paddles lift and fold the resin melt as it passes by on the conveyor belt. After each paddle set, a roll can also be provided that redistributes the resin across the belt. This redistribution is particularly useful toward the end of the zone where the resin will be advanced and have a high viscosity. The conveyor belt carrying the further advanced resin then moves into the high-temperature zone where the blowing agent is activated. Thus, after the mixture has gelled but is still soft and formable, the blowing agent, which can be one chosen to activate at 250 degrees F., can then be activated by heating it to such temperature, allowing it to give off gas to cause the gel sheet to foam and rise. As it cures and cools at the end of the conveyor oven chamber, it forms a rigid foam structure which can be cut off at desired lengths at the end of the conveyor.

A variation on the above conveyor process is that the blowing agent is omitted; and when the resole/nonolac blend has advanced to the proper gel state, it is allowed to cool, harden and drop off the conveyor into a grinder and air mill. The powder produced is then blended with a percentage by weight of blowing agent and continuously deposited onto a second heat tunnel where it is foamed and cured. The advanced resin from the first heat tunnel can also be rolled after the blowing agent addition and further processed, as described above.

In a preferred embodiment the foam of the fifth embodiment can be produced by mixing the nonolac resin and resole resin together in a ratio between 20:80 and 80:20 by weight in a roll mill under a shear force at a temperature above their melting temperatures to cause the two resins to react to produce a partial cross-linking or gel state. The gel is then removed from the roll mill, cooled and allowed to harden. The hardened gel is ground into a fine powder. A solid state heat-activatable blowing agent in the range of 0.5% to 3% by weight based on the gel powder weight is intimately blended into the powdered phenolic resin gel by a second roll milling under shear force melt processing, and the thus processed mixture is then cooled. The addition of the blowing agent during the second rolling step prevents the blowing agent from releasing any gas too early. The later addition of the blowing agent also facilitates the ease of producing a resin system with the proper advancement, gel state and viscosity. The later addition of the proper blowing agent helps to produce foams with optimal properties. Thus if the blowing agent were added to the original batch mixture, much of it would be activated and leave the rolls as a gas and would not be available for blowing and expanding the resin during the foaming process. By using a second rolling step to add the solid state heat-activatable blowing agent to the phenolic resin system, one can keep the temperature lower so as not to release the gas prematurely. Further, the addition and mixing of the blowing agent during the second roll mill operation allows the first roll temperatures to be higher than the activation temperature of the blowing agent, thus shortening the rolling time and providing for greater control over the process. In a preferred embodiment the blowing agent can be Cylacell brand blowing agent. When processing the resole/nonolac blend at higher temperatures with the decrease in viscosity during the initial melting phase, it has been found easier to add fillers or extenders to the mixture because of the increased wetting ability. Natural, as well as engineered, fillers and reinforcers, such as microspheres or nanotubes, can be added to the mixtures in small amounts and will not affect the blowing/expanding ratio to any significant degree.

Foam produced by the process of this invention can be used as a precursor for making carbon foams by placing the phenolic foam produced by this invention into a carbonizing furnace and carbonizing it.

When one is utilizing the process having two rollings, it is important that the pre-rolling of the resole and nonolac resin to a gel point, where such gel is cooled, ground and then has the blowing agent added to the ground powder to form a new mixture, is then re-rolled to bring the blowing agent down into the gel's micro level and even to the gel's molecular level. After cutting the material off the rolls or sheeting it and cooling the sheets and grinding the sheets into particles, the particles can be placed, in one embodiment, into the cavity of a preheated metal mold which is closed and where the foaming resin then expands to fill the mold cavity and sets. The set foam can be cooled, and the foam part can then be extracted from the mold.

When making shaped parts in mold cavities, it is not necessary to cool the mold before ejecting the part because the material system is thermoset and the part will be solid and rigid, after curing in the mold, at the mold temperature.

With respect to foaming directly the sheeted material cut from the roll mill produced at the "blowing agent addition" milling step by placing the hot, flexible sheet into a mold and bypassing the cooling and grinding steps, this process is particularly useful for parts of large area, but small cross-section, such as panels having contours.

It should be noted that the rise flow is determined by a combination of factors working in counter fashion to each other. For example, the higher the degree of gelling in the resin, the more resistance will be offered against the vapor pressure produced by the blowing agent and vice versa. Another set of factors consists of the foaming temperature (oven temperature) and the degree of gelling. For example, when the degree of gelling is low, the foaming temperature is high because the high temperature is needed to advance the resole/nonolac system quickly to a gel state before blowing occurs.

It should be noted that the initial mixing of the resole and nonolac resins can be accomplished by means other than dry powder blending. For example, if side-by-side reactors, one producing novelac and the other producing resole, are brought to discharge readiness at the same time, both reactors can be simultaneously emptied by meter pumping the resins into a static mixing tube and depositing the tube discharge onto a cooling conveyor belt which in turn empties into a grinder. The resole reactor holding time is the limiting factor for such a process.

Another initial process is the compounding extrusion of the resole/nonolac powders. It should be noted that this initial compounding extrusion blending would not replace the roll milling step but is within the scope of this invention if the problems involved therewith could be overcome pertaining to the compounding extrusion of such gel state materials.

In some cases where the resin is cut off the milling rolls, the rough sheet so produced can be immediately run through a set of calender rollers to produce a sheet of uniform thickness which, when heated such as by an oven or in a heat tunnel to above the activation temperature of the blowing agent, will foam and thermally set to produce a sheet of foamed material.

It should also be noted that the rise flow, which is the stiffness or viscosity of the foaming resin, is very much determined by the blowing agent loading level and its relationship to the resole concentration and the rolling time/roll temperature, resulting in the potential blowing volume. The higher the concentration of resole which is the self-curing component that only needs heat to cure and the higher degree that such resole component is advanced or cross-linked, the less time the blowing action will have before the resin is so stiff that the internal pressure being generated from the blowing agent is not enough to expand the foam any more. The difficulty with a single roll process is that if one uses a solid, single-stage powder mixed with the appropriate percentage of blowing agent powder in a 250 degree F. oven, the resin may cure before the blowing agent activates. If such mixture is placed in a 350 degree F. oven, the blowing agent activates too soon; and the resole will not be sufficiently advanced to provide back pressure or resistance to the gas. Thus the gas will just bubble out of the resin, producing very large-cell foams that have rigid and clear cell walls, which foams may be useful if the proper process control parameters were perfected and employed. Thus the time and temperature are critical so that the advantages of the two-step rolling process in which the blowing agent is added after the first rolling are significant. Further, by avoiding pure resole systems, since resole resins are subject to water absorption or hydrolysis, and instead using resole/nonolac mixtures because nonolac is not water-absorbing, the water absorption factor is greatly reduced. Because foams soak up liquid into the open-celled structure, the term "water absorption" must be distinguished from "hydrolysis" which is water actually being absorbed into the cell walls and being attracted by bipolar forces into the intra molecular volume. This intrusion of water results in swelling of the cell wall and the reduction of utilitarian properties.

It should be noted that other mixing methods other than roll milling can be utilized to produce the phenolic foam of this invention. Additional examples of devices that can be used to mix the resole and nonolac resins are compounding extruders having sufficient torque, pug mill mixers and sigma blade bulk mixers.

Although the present invention has been described with reference to particular embodiments, it will be apparent to those skilled in the art that variations and modifications can be substituted therefor without departing from the principles and spirit of the invention. To be more specific, the spirit of the invention is not limited to the straight or classical definition of phenolic resins but encompasses the modified phenolic resins in as much as the modified resins contribute to superior phenolic foam products. The meaning of "superior" encompasses improvements in friability, hydrolysis, fire resistance, all general physical strength properties, open/closed cell ratio end products, water absorption, electronic, carbon yield, etc. Modified phenolic resins and urea types are some examples which can include epoxidized or cresol novelac resins. The more exotic starting materials, such as made by newer synthetic techniques for preparation of monomeric/dimeric components for resoles and novelac resins followed by oligomerization to produce various branching patterns and substitution patterns, can also be used for making acid/alkaline free phenolic foams.

I claim:

1. A process for producing a strong, lightweight, pH-neutral, phenolic foam, comprising the steps of:
blending a novolac resin, resole resin and heat-activatable blowing agent together to form a mixture;
roll-milling said mixture to form a gel;
heating said gel;
activating said blowing agent to provide gas in said gel;
blowing said gel by said gas to form a foam; and
heat-curing said foam.

2. A process for producing a strong, lightweight, pH-neutral, phenolic foam, comprising the steps of:
blending a novolac resin and resole resin together to form a mixture;
roll-milling said mixture to form a gel;
blending a heat-activatable blowing agent directly into said gel;
heating said gel;
activating said blowing agent to provide gas in said melted gel;
blowing said gel by said gas to form a foam; and
heat-curing said foam.

3. A process for producing a strong, lightweight, pH-neutral, phenolic foam, comprising the steps of:
blending a novolac resin and resole resin together to form a mixture;
roll-milling said mixture to form a gel;
cutting said gel off said rolls
cooling said gel;
grinding said cooled gel;
blending a heat-activatable blowing agent with said ground material;
rolling said material of gelled resin and heat-activatable blowing agent;
heating said mixture;
activating said blowing agent to provide gas in said heated mixture;
blowing said mixture by said gas to form a foam; and
heat-curing said foam.

4. A process for producing a strong, lightweight, pH-neutral, phenolic foam, comprising the steps of:
blending a novolac resin and resole resin together to form a mixture;
roll-milling said mixture to form a gel;
cutting said gel off said rolls
cooling said gel;
grinding said cooled gel;
blending a heat-activatable blowing agent directly with said ground material;
rolling said material of novolac and resole resins and heat-activatable blowing agent;
cutting said material off said rolls;
cooling said material;
grinding said material
heating said ground material to a cure temperature that is above the activation temperature of said blowing agent;
activating said blowing agent to provide gas in said material;
blowing said material by said gas to form a foam; and
heat-curing said foam.

5. The process of claim 1 further including the step of:
providing said novolac resin in proportion to said resole resin in a ratio between 20:80 to 80:20.

6. The process of claim 2 further including the step of:
providing said novolac resin in proportion to said resole resin in a ratio between 20:80 to 80:20.

7. The process of claim 3 further including the step of:
providing said novolac resin in proportion to said resole resin in a ratio between 20:80 to 80:20.

8. The process of claim 4 further including the step of:
providing said novolac resin in proportion to said resole resin in a ratio between 20:80 to 80:20.

9. A process for producing a strong, lightweight, pH-neutral, phenolic foam, comprising the steps of:
providing a novolac resin in proportion with a resole resin in a ratio between 20:80 to 80:20 to form a novolac resin/resole resin mixture;
compounding said novolac resin/resole resin mixture together to cause said two resins to cross link and form a gel;
blowing said gel to form an expanded cellular foam structure; and
curing said foam structure to rigidity.

10. A process for producing a strong, lightweight, pH-neutral, phenolic foam, comprising the steps of:
providing a novolac resin in proportion with a resole resin in a ratio between 20:80 to 80:20 to form a novolac resin/resole resin mixture;
adding a solid state blowing agent activatable by temperatures above 250 degrees F. to said novolac resin/resole resin mixture in a proportion of approximately 1% by weight of said novolac resin/resole resin mixture;
mixing said novolac resin, resole resin and blowing agent together at a temperature below 250 degrees F. to cause said two resins to slightly react with a very loose cross linking;
forming a gel from said resins;
cooling said gel;
hardening said gel;
grinding said hardened gel into a fine powder;
heating said powder at a temperature above the 250 degree F. activation temperature of said blowing agent;
melting said powder;
providing gas in said melted powder by the action of said activated blowing agent;
forming an expanding mixture of said resins into a foam by the action of said gas; and
curing said foamed resin after said expansion has ceased.

11. The process of claim 10 wherein the step of mixing said novolac resin, resole resin and solid state blowing agent is accomplished by a heated roll mill.

12. The process of claim 11 wherein said ground powder is heated in a 350 degree F. oven.

13. A method of producing a strong, lightweight phenolic foam, comprising the steps of:
mixing a novolac resin and a resole resin together in a ratio between 20:80 to 80:20 by shear force melt processing at a temperature above their melting temperatures, causing said resins to react, producing a partial cross-linking and forming a gel;
cooling said gel;
hardening said gel;
grinding said hardened gel into a fine powder;
adding a solid state heat-activatable blowing agent in the range of 0.5% to 3% by weight based on the weight of said resin powder;
blending said blowing agent into said phenolic resin powder by shear force melt processing to form a processed mixture;
heating said mixture to activate said blowing agent to release gas in said mixture;
forming a foam of such mixture by said released gas; and
curing said foam.

* * * * *